United States Patent
Rolfsmeier et al.

(10) Patent No.: US 9,791,844 B2
(45) Date of Patent: Oct. 17, 2017

(54) METHOD FOR INFLUENCING A CONTROL PROGRAM OF A CONTROL DEVICE

(71) Applicant: dSPACE digital signal processing and control engineering GmbH, Paderborn (DE)

(72) Inventors: Andre Rolfsmeier, Bad Lippspringe (DE); Thorsten Hufnagel, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 392 days.

(21) Appl. No.: 14/527,242

(22) Filed: Oct. 29, 2014

(65) Prior Publication Data
US 2015/0120011 A1   Apr. 30, 2015

(30) Foreign Application Priority Data
Oct. 29, 2013   (EP) .................................. 13190584

(51) Int. Cl.
| | | |
|---|---|---|
| *G06F 19/00* | (2011.01) | |
| *G05B 19/05* | (2006.01) | |
| *G05B 19/042* | (2006.01) | |

(52) U.S. Cl.
CPC ....... *G05B 19/056* (2013.01); *G05B 19/0426* (2013.01); *G05B 2219/13165* (2013.01)

(58) Field of Classification Search
USPC .................................................... 700/17, 83
See application file for complete search history.

(56) References Cited

U.S. PATENT DOCUMENTS

| | | | | |
|---|---|---|---|---|
| 4,884,203 A * | 11/1989 | Preis ..................... | B60K 31/047 | |
| | | | 180/179 | |
| 5,781,397 A * | 7/1998 | Schrey ..................... | F01L 9/04 | |
| | | | 361/154 | |
| 8,108,852 B2 | 1/2012 | Petig et al. | | |
| 8,423,984 B2 | 4/2013 | Iwasaki | | |
| 8,645,918 B2 | 2/2014 | Leinfellner et al. | | |
| 8,818,615 B2 * | 8/2014 | Dressler .............. | G06F 11/3664 | |
| | | | 701/29.1 | |

(Continued)

FOREIGN PATENT DOCUMENTS

| | | |
|---|---|---|
| CN | 101617322 A | 12/2009 |
| CN | 101763291 A | 6/2010 |

(Continued)

OTHER PUBLICATIONS

Japanese Office Action for Japanese Application No. 2014-218868 dated Sep. 26, 2016 with English translation.

(Continued)

*Primary Examiner* — Kidest Bahta
(74) *Attorney, Agent, or Firm* — Muncy, Geissler, Olds & Lowe, P.C.

(57) ABSTRACT

A method for influencing a control program having a plurality of first functions and at least one of the first functions is configured to control an actuator, and a memory is provided and the memory has memory regions occupied by subprograms assigned to the first functions, whereby there is a branch address in the program code of the control program when one of the first functions is called up that points to a memory address of the subprogram associated with the function call. The control program is analyzed for the occurrence of function calls, and the branch addresses, associated with the function calls, and addresses of the return commands are ascertained. One of the first functions is selected to be deleted. The first function is replaced by a second function, in which the program code of the selected first function is overwritten by the program code of the second function.

19 Claims, 2 Drawing Sheets

(56) References Cited

U.S. PATENT DOCUMENTS

| | | | |
|---|---|---|---|
| 2003/0036871 A1* | 2/2003 | Fuller, III | G06F 9/44505 |
| | | | 702/119 |
| 2008/0065239 A1* | 3/2008 | Leinfellner | G05B 19/0423 |
| | | | 700/34 |
| 2008/0082228 A1* | 4/2008 | Massen | G01M 15/05 |
| | | | 701/31.4 |
| 2010/0192015 A1* | 7/2010 | Dressler | G06F 11/3656 |
| | | | 714/32 |
| 2010/0325733 A1 | 12/2010 | Honda | |
| 2012/0185859 A1 | 7/2012 | Kashiwaya et al. | |
| 2014/0115561 A1* | 4/2014 | Hessenkamper | G05B 19/408 |
| | | | 717/114 |

FOREIGN PATENT DOCUMENTS

| | | |
|---|---|---|
| CN | 102667715 A | 9/2012 |
| DE | 103 35 989 A1 | 3/2005 |
| DE | 10 2004 027 033 A1 | 10/2005 |
| JP | H 11-96051 A | 4/1999 |
| JP | 2002-335186 A | 11/2002 |
| JP | 4516046 B2 | 5/2010 |
| JP | 2011-028648 A | 2/2011 |
| WO | WO 2008/111382 A1 | 9/2008 |

OTHER PUBLICATIONS

Chinese Office Action for Chinese Application No. 20140407642.3 dated Oct. 9, 2016—English translation.

* cited by examiner

METHOD FOR INFLUENCING A CONTROL PROGRAM OF A CONTROL DEVICE

This nonprovisional application claims priority under 35 U.S.C. §119(a) to European Patent Application No. 13190584.6, which was filed in Europe on Oct. 29, 2013, and which is herein incorporated by reference.

BACKGROUND OF THE INVENTION

Field of the Invention

The invention relates to a method for influencing a control program of a control device.

Description of the Background Art

Control devices are used in large numbers in many sectors of technology. An especially important field of application is, inter alia, engine, transmission, and chassis control in automobiles and the control of engines in aircraft. The program code is usually stored in binary form in such control devices. Changing the particular control program, preferably stored in a read-only memory, is not easily possible.

SUMMARY OF THE INVENTION

It is therefore an object of the invention to provide a method for influencing a control program of a control device.

A method for influencing a control device is known from the publication DE 10 2004 027 033 A1, which corresponds to U.S. Pat. No. 8,645,918, which is incorporated herein by reference.

According to an embodiment of the invention, a method for influencing a control program of a control device is provided, whereby the control program has a plurality of first functions and at least one of the first functions is configured to control an actuator, and a memory is provided and the memory has memory regions occupied by subprograms assigned to the first functions, and the control program is a binary program code, whereby there is a branch address in the program code of the control program when one of the first functions is called up, and the branch address points to a memory address of the subprogram associated with the function call, and whereby the subprogram is a sequence of binary program code, and there is a return command at the end of the sequence of the subprogram program code, and whereby the program code of the control program is analyzed for the occurrence of function calls, and the branch addresses, associated with the function calls, and addresses of the return commands are ascertained and from the ascertainment the size of the memory regions, occupied by the particular subprograms, is determined, and the identifiers, assigned to the first functions, with the memory region sizes and addresses, assigned to the particular first functions, are displayed on a display unit, whereby the display unit is formed as part of a computer system, and at least one of the first functions is selected as to be deleted by means of the computer system, and the size and address of the selected first function are saved in an information structure, and at least one function call of the selected first function is deactivated, and/or the first function is replaced by a second function, in which the program code of the selected first function is overwritten by the program code of the second function.

It should be noted that in the present case the term information structure can be understood both as a file and as a file structure and also as a data structure within a working program. It should be noted, furthermore, that the term subsystem can understood to be a model, preferably shown graphically, of a selected function, i.e., to be deleted, or of an unoccupied region of the memory. It is advantageous hereby to assign a subsystem to each selected first function and unoccupied free memory regions. It should be noted further that the term "identifier" can be understood to be, inter alia, a first so-called temporary name of a subprogram. It is basically provided to replace the first temporary name by the "correct" function name after the actual, i.e., "correct" function name is determined.

An advantage of the method for influencing a control program of a control device is that in older control devices as well, which are being used for controlling engines, changes, so-called updates, can be made in the control program without having to know the source code of the control program or a description of the control program with a list of the subprograms or the names and branch addresses. With the present method, the user is largely independent of the lack of information from the control program vendor. In the field of engine tuning as well, the method enables a simple and cost-effective yet very extensive intervention in the control program.

In an embodiment, a plurality of first functions to be deleted are selected and replaced by a plurality of second functions. To this end, the functions named by an identifier are shown graphically in the display unit with their size and addresses. Next, the functions to be modified or deleted are selected and replaced by second functions. The memory also can contain free memory regions, in addition to the memory regions occupied by subprograms. Tests have shown that it is advantageous, if a unique segment name is assigned to the individual memory regions, occupied by the first functions selected to be deleted, and also to the free memory regions and saved in the information structure. The identifier can correspond to the segment name or the identifier and the segment name are identical. Accordingly, the identifier, the branch address of the subprogram call, the length, i.e., the size of the subprogram, and the segment name are stored for each free memory region in the information structure. An advantage of the assignment of segment names is that a further ordering criterion is available in a plurality of memory regions and a classification, i.e., ordering by segment name, can be performed.

It is advantageous in a further embodiment that individual coherent memory regions and the size and addresses of the individual memory regions can be determined from an analysis of the addresses and sizes of the memory regions of the first functions to be deleted and stored in the information structure.

In a further embodiment, an empty subsystem can be created by the computer system for each memory region of a first function to be deleted and/or for each free memory region before generation of the program code of the second function and assigned to the memory region, and the assignment of the subsystem to the memory region is stored in the information structure and/or in the subsystem. The second function can also be assigned to an empty subsystem. Furthermore, according to an embodiment a meta-information can be assigned to the empty subsystem and the meta-information is stored in the information structure and/or subsystem.

In a further refinement, a plurality of subsystems can be connected together by means of program calls and the links with which subsystems are connected are stored in the information structure and/or subsystems. Tests have shown that it is advantageous for each subsystem to generate a separate program code, for example, in the form of a C file. It is clear that other programming languages can also be used.

In an embodiment, binary program code can be generated for the second function by means of a compiler and, provided a meta-information is available, the meta-information is entered in the binary program code.

Tests have shown that it is advantageous to display the memory regions, assigned to the first functions, in the computer system only when the assigned memory regions exceed a predetermined minimum size. In a further embodiment, it is advantageous, if it is analyzed by a test program whether the memory region of the selected single or plurality of first functions is sufficient for the size of the second function.

In a further embodiment, memory regions are tested by a heuristic method and the memory requirement of the second function is determined from the number and/or type of employed blocks. In an embodiment, during the generation of the binary program code of the second function, during a division of the binary program code of the second function into a plurality of memory regions, appropriate branch commands are inserted in the generated program code as a function of the division into the plurality of memory regions. In this case, the term appropriate branch commands can be taken to mean that at the address end of a memory region a branch command is called which points to the start of the address of another memory region. It is clear that generation of the program code is understood to be compilation step in which a binary program code is generated from a programming language, particularly C-program steps. The binary program code of the second function can be written in the assigned memory region(s).

In an embodiment, after the assignment of a second function, the remaining memory region is displayed in the computer system. An advantage is that in a plurality of second functions it can be tested successively whether sufficient memory space is available for a further second function.

In a further embodiment, a return command is stored in the memory at the target site of the branch address of the selected first function. It is clear that the address where the return command is written is hidden for the program code of the second function and is not described with the program code of the second function. If a function call of one of the first selected functions is not found and not deactivated and consequently the first function is still called, a straightforward return occurs in the execution of the program code and the program is executed further. In the case of a call of the second function, the call is set to the memory address following the return command or, stated differently, the second function begins only at the memory address following the return command. This increases the security during a change in the memory content.

A further embodiment provides that there already is a free memory region before the memory region of the first function to be deleted. Both regions are combined into a large memory region and a single subsystem is generated for it and assigned to one of the second functions. In order to assure that a call of the first function does not jump in the middle in the second function, the return command is placed at the original address location of the branch address of the first function. The program code of the second function occupies the remaining region of the memory region, but not the address of the return command. It is clear that all calls for the second function point to the start address of the second function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
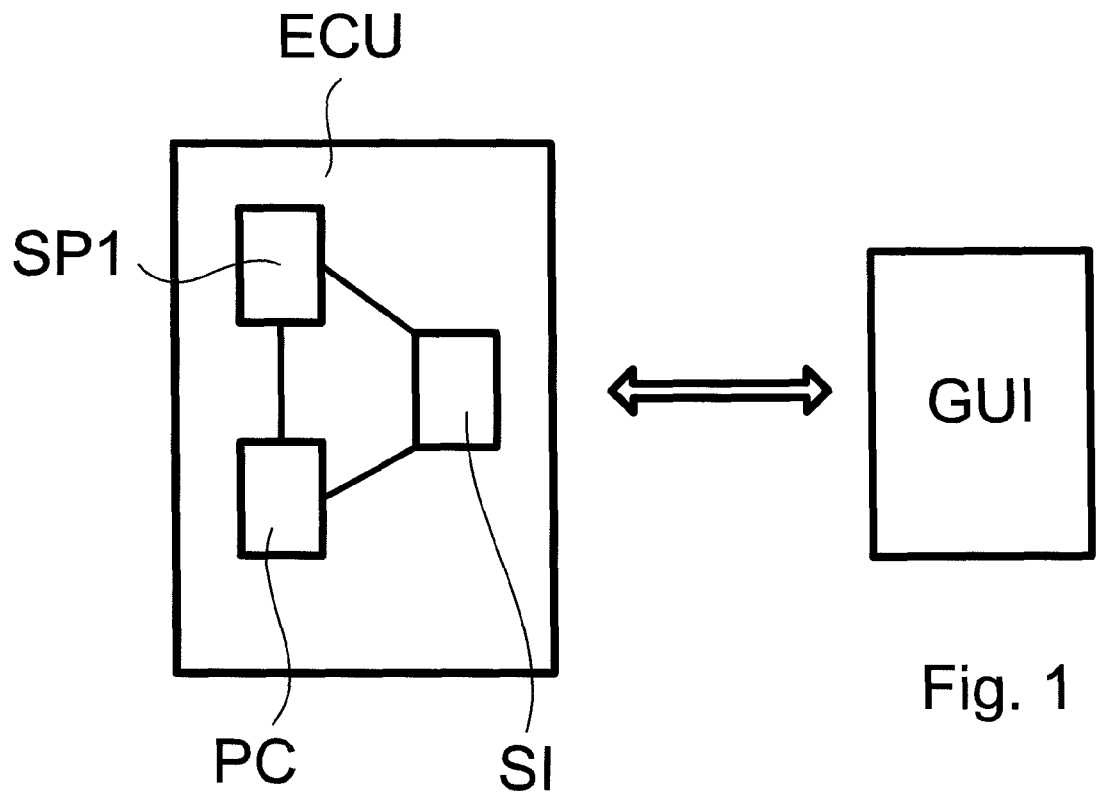
FIG. 1 shows a simplified structure of a control device in conjunction with a display unit.

The illustration in FIG. 1 shows a control device ECU having a memory SP1, an interface unit SI, and a processor PC. The control device ECU is in data communication with a computer system GUI by means of the interface unit SI. The computer system GUI comprises a display unit (not shown). In general, the display unit is also called a graphical interface unit. A control program is executed in the control unit ECU by means of the processor PC. The control program exists as a binary program code and can also be called the main program. The control program comprises a plurality of first functions F1A, F1B, F1C, . . . F1N, shown in the illustration of FIG. 2. A preferred task of at least one part of the first functions F1A, F1B, F1C, . . . F1N is control of one or more actuators (not shown). Further, first functions F1A, F1B, F1C, . . . F1N are assigned subprograms.

The control program is executed by the processor PC, whereby there is a branch address in the program code of the control program for calling one of the first functions (F1A, F1B, F1C, . . . F1N). In this regard, the branch address points to a memory address of the subprogram linked to the function call. The particular subprogram is available, like the control program, as a sequence of a binary program code. At the end of the sequence of the program code of the subprogram, a return occurs by means of a return command to a predetermined site of the main program and the program code of the control program is executed further.

The program code of the control program is analyzed by means of the computer system GUI for the occurrence of function calls and the branch addresses, associated with the function calls, and addresses of the return commands are ascertained and the size of the memory regions of memory SP1 that are occupied by the particular subprograms is derived from the ascertainment. Furthermore, the determined subprograms are provided with an identifier. In this case, the term "identifier" comprises the names assigned to the subprograms. The determined data, i.e., the size and address of the determined first function F1A, F1B, F1C, . . . F1N and the particular identifier are saved in an information structure IST, shown in the illustration of FIG. 3. Furthermore, the identifiers assigned to the first functions F1A, F1B, F1C, ... F1N with the memory region sizes and addresses, assigned to the particular first functions F1A, F1B, F1C, ... F1N, are displayed in the display unit.

Figure 2:
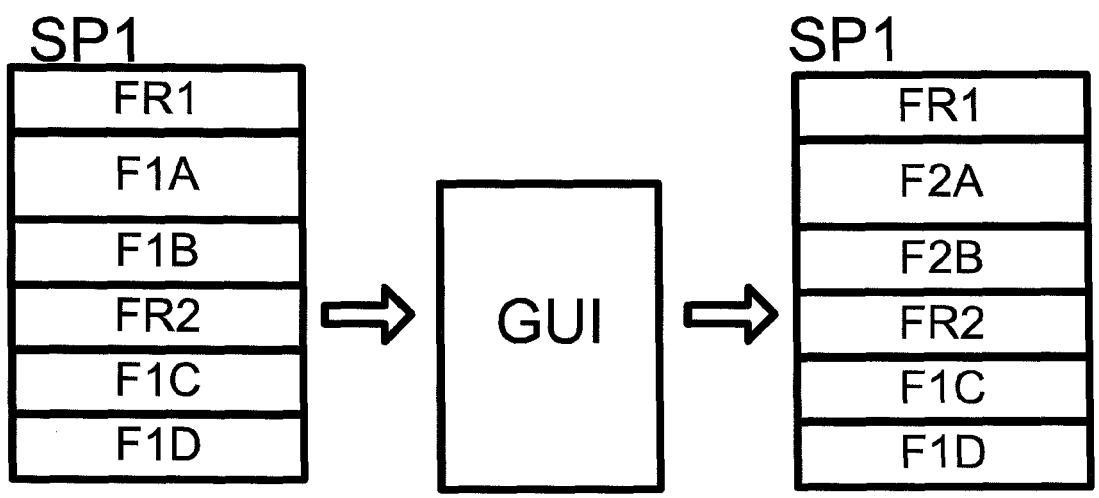
FIG. 2 shows a detailed breakdown of the memory from the illustration in FIG. 1 before and after the changing of the memory content.

The illustration of FIG. 2 shows a schematized allocation of the memory space for memory SP1, illustrated in the illustration of FIG. 1. Only the differences relative to the illustration in FIG. 1 will be described below. A plurality of first functions F1A, F1B, F1C, ... F1N are stored in the memory SP1. Free memory regions FR1 and FR2 are formed between a part of the first functions F1A, F1B, F1C, ... F1N. The first first function F1A and the second first function F1B are selected as to be deleted by means of the computer system GUI from the plurality of the determined first functions F1A, F1B, F1C, ... F1N. In the end, the program code of the selected first functions F1A and F1B is overwritten by the program code of the first second function F2A and by the second second function F2B.

After the analysis of the program code, the first second function F2A and the second second function F2B are stored in place of the previous first functions F1A and F1B by means of the display unit; in other words, the selected first functions F1A and F1B are replaced.

Figure 3:
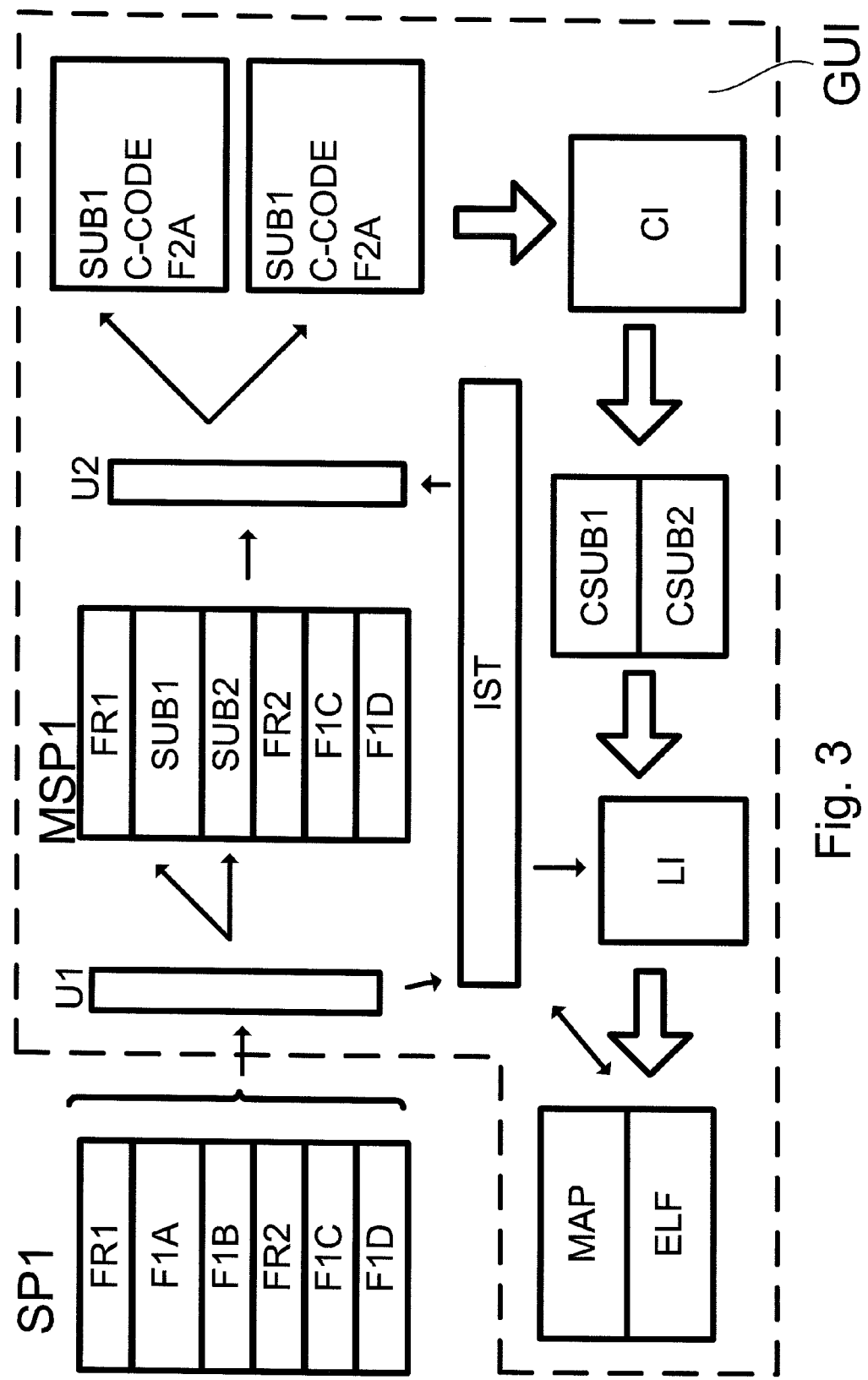
FIG. 3 shows a simplified illustration of an embodiment of the method of the invention.

Part of the structure of the computer system GUI is shown simplified in the illustration in FIG. 3. Only the differences relative to the illustrations of the previous figures will be explained below. In the analysis, i.e., in the examination of the program code of the control program, during a first step U1 the determined data for the first functions F1A and F1B to be deleted are saved in the information structure IST. In addition to the determined data, the memory regions of the first functions F1A and F1B to be deleted are assigned a segment name and saved in the information structure IST. After this, memory spaces of the identifiers, said memory spaces assigned to the two first functions F1A and F1B and now classified as free, the start address of the free memory space, the length, i.e., the size of the memory region, and the segment name are stored in the information structure IST.

Next, a first subsystem SUB1 is assigned to the free memory space linked to the first first function F1A and a second subsystem SUB2 to the free memory space linked to the second first function F1B. The changed division of the memory regions of the memory SP1 is shown as model MSP1 of the memory SP1 in a display unit. The free memory regions FR1 and FR2 are also shown in the display unit. In the present case, both free memory regions FR1 and FR2 are not linked to the subsystems. In an alternative embodiment, which is not shown, the free memory regions FR1 and FR2 can also be linked to subsystems and shown, provided the sizes of the free memory regions FR1 and FR2 exceed a predetermined minimum size.

In a second step U2 with use of the data from the information structure IST, the C code of the first second function F2A is generated for the first subsystem SUB1 and the C code of the second second function F2B is generated for the second subsystem SUB2, and these are assigned to the respective subsystems SUB1 and SUB2. During the generation of the C code, the first second function F2A and the second second function F2B are each assigned to a segment name by a generation by the compiler of specific C code statements. In a following compilation step, the binary program code is generated by means of a compiler CI as a first object file CSUB1 and a second object file CSUB2. The resulting two object files CSUB1 and CSUB2 also contain so-called meta-address information in addition to the binary program code. It is clear that the program code of the first object file CSUB1 corresponds to the first second function F2A and the program code of the second object file CSUB2 to the second second function F2B.

Tests have shown that it is advantageous to analyze the two object files CSUB1 and CSUB2 with respect to the size of the memory space needed in each case and to compare them with the size of the available memory region. If the comparison shows that the size of the assigned memory region is not sufficient, a further memory region can be generated by the deletion of further first functions F1C and F1D, and/or memory regions FR1 and FR2, not occupied by first functions F1A, F1B, F1C, and F1D, are used.

Provided a division of one of the second functions F2A and F2B into a plurality of subsystems or a plurality of memory regions occurs, jump instructions corresponding hereto are introduced during C code generation.

It should be noted that adjacent free memory regions and memory regions of the previously deleted first functions can be merged into a larger free memory region. In a following step, the generated binary program code of the object files CSUB1 and CSUB2 is allocated by means of a linker LI to the free memory regions, in the present case therefore the memory regions of the previously deleted first functions or the merged free memory regions. Information, necessary for the assignment, is made available to the linker LI from the information structure IST. Preferably, a so-called linker command file, readable for the linker LI, is generated from the information on the information structure IST. The linker LI subsequently generates a binary file ELF, preferably in the ELF file format. The binary file ELF in the ELF format contains the program code of the object files CSUB1 and CSUB2 distributed over the free memory regions; these are the memory regions of the previously deleted first functions or the merged free memory regions. Further, the linker LI generates a so-called map file MAP with information on the location and size of the individual segments.

In a further step, the unneeded memory region of the particular subsystem SUB1 and SUB2 is determined by comparing the content of the map file MAP with the content of the information structure IST and displayed in the display unit.

It is clear that the individual steps of the method can also be carried out repeatedly. In particular, after the first selection of the first functions to be deleted, other first functions to be deleted can be selected. The size can also be tested at any time by the computer system GUI. It is advantageous, furthermore, that the result of the last code generation combined with the changed blocks is used for an improved estimation of the size of the memory space requirement.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for updating a control program of a control device, the method comprising:
providing the control program with a plurality of first functions and at least one of the first functions is configured to control an actuator, the control program being a binary program code;
providing a memory that has regions occupied by subprograms assigned to the first functions, wherein there is a branch address in the program code of the control program when one of the first functions is called up, and the branch address points to a memory address of a subprogram associated with the function call, wherein the subprogram is a sequence of binary program code, and wherein there is a return command at the end of the sequence of the subprogram program code;

analyzing the program code of the control program for the occurrence of function calls, and the branch addresses associated with the function calls;

ascertaining addresses of the return commands;

determining, from the ascertainment, a size of the memory regions occupied by the particular subprograms of the memory;

displaying on a display unit the identifiers assigned to the first functions with the memory region sizes and addresses assigned to the particular first functions, the display unit being formed as part of a computer system;

selecting at least one of the first functions to be deleted by the computer system;

saving the size and address of the selected first function in an information structure; and deactivating at least one function call of the selected first function, and/or the first function is replaced by a second function in which the program code of the selected first function is overwritten by the program code of the second function.

2. The method according to claim 1, wherein a plurality of first functions to be deleted are selected and replaced by a plurality of second functions.

3. The method according to claim 1, wherein the memory contains free memory regions.

4. The method according to claim 1, wherein a unique segment name is assigned to the occupied memory regions, and the first functions selected to be deleted, and the free memory regions.

5. The method according to claim 1, wherein individual coherent memory regions and a size and addresses of the individual memory regions are determined from an analysis of the addresses and sizes of the memory regions of the first functions to be deleted and stored in the information structure.

6. The method according to claim 4, wherein segment names are stored in the information structure.

7. The method according to claim 1, wherein an empty subsystem is created by the computer system for each memory region of a first function to be deleted and/or for each free memory region before generation of the program code of the second function and assigned to the memory region, and the assignment of the subsystem to the memory regions is stored in the information structure and/or in the subsystem.

8. The method according to claim 7, wherein the second function is assigned to an empty subsystem.

9. The method according to claim 7, wherein a meta-information is assigned to the empty subsystem and the meta-information is stored in the information structure or the subsystem.

10. The method according to claim 7, wherein a plurality of subsystems are connected together via program calls and links are stored in the information structure and/or the subsystem.

11. The method according to claim 7, wherein a separate program code in the form of a C file is generated for each subsystem.

12. The method according to claim 1, wherein the binary program code is generated for the second function via a compiler and, provided a meta-information is available, the meta-information is entered in the binary program code.

13. The method according to claim 1, wherein the memory regions assigned to the first functions are displayed in the computer system, provided the assigned memory regions exceed a predetermined minimum size.

14. The method according to claim 1, wherein a test program analyzes whether the memory region of the selected first function is sufficient for the size of the second function.

15. The method according to claim 1, wherein the memory regions are tested by a heuristic method and the memory requirement of the second function is determined from the number and/or type of employed blocks.

16. The method according to claim 1, wherein, during the generation of the binary program code of the second function, during the division of the binary program code of the second function into a plurality of memory regions, appropriate branch commands are inserted in the program code as a function of the division.

17. The method according to claim 1, wherein after the assignment of a second function, the remaining memory region is displayed in the computer system.

18. The method according to any one of the preceding claims, characterized in that the binary program code of the second function is written in the assigned memory region.

19. The method according to claim 1, wherein a return command is stored in the memory at the target site of the branch address of the selected first function.

* * * * *